(12) United States Patent
Wilmot et al.

(10) Patent No.: US 9,690,686 B1
(45) Date of Patent: Jun. 27, 2017

(54) METHOD FOR SETTING BREAKPOINTS IN AUTOMATICALLY LOADED SOFTWARE

(71) Applicant: Cadence Design Systems, Inc., San Jose, CA (US)

(72) Inventors: Andrew Wilmot, Carlisle, MA (US); William W. LaRue, Jr., Leawood, KS (US); Neeti Bhatnagar, San Jose, CA (US); Dave Von Bank, Rogers, MN (US); Joshua Levine, Redwood City, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 5 days.

(21) Appl. No.: 14/230,604

(22) Filed: Mar. 31, 2014

(51) Int. Cl.
*G06F 11/36* (2006.01)
*G06F 9/455* (2006.01)
*G06F 17/50* (2006.01)

(52) U.S. Cl.
CPC .......... *G06F 11/3624* (2013.01); *G06F 9/455* (2013.01); *G06F 11/3664* (2013.01); *G06F 17/50* (2013.01)

(58) Field of Classification Search
CPC .. G06F 11/36–11/3664; G06F 9/455–9/45558; G06F 2009/45562–2009/45595; G06F 11/1484; G06F 11/301; G06F 2212/151; G06F 17/50; G06F 17/5009; G06F 17/5022
See application file for complete search history.

(56) References Cited

U.S. PATENT DOCUMENTS

| 5,548,717 | A | 8/1996 | Wooldridge et al. |
| 5,809,283 | A | 9/1998 | Vaidyanathan et al. |
| 5,815,714 | A * | 9/1998 | Shridhar .................. G06F 8/30 714/E11.21 |
| 6,859,892 | B2 * | 2/2005 | Bolding .............. G06F 11/3632 714/11 |
| 7,356,679 | B1 | 4/2008 | Le et al. |
| 7,478,388 | B1 | 1/2009 | Chen et al. |
| 7,529,897 | B1 | 5/2009 | Waldspurger et al. |

(Continued)

OTHER PUBLICATIONS

Magnusson, P., et al. "SimICS/sub4m: A Virtual Workstation", Proceedings of the USENIX Annual Technical Conference [online], 1998 [retrieved Jan. 12, 2015], Retrieved from Internet: <URL: http://citeseer.ist.psu.edu/viewdoc/download;jsessionid=87E4497EECD201DF82C6336071F4047A?doi=10.1.1.121.9133&rep=rep1&type=pdf>, pp. 1-13.*

(Continued)

*Primary Examiner* — Todd Aguilera
(74) *Attorney, Agent, or Firm* — Andrews Kurth Kenyon LLP

(57) ABSTRACT

Aspects of the present invention provide a system and method for a user of an event-driven simulator to specify breakpoint conditions in kernel modules, startup processes, shared libraries, and other automatically loaded software elements before the target environment is initialized. The virtual platform detects specified breakpoints when a file is loaded onto a virtual platform debugger during startup of the environment or initialization of the relevant processes. The virtual platform debugger may scan for specified breakpoints in all loaded source code files, in only those source code files that are automatically loaded, or in only those source code files specified by the designer as modified.

20 Claims, 4 Drawing Sheets

(56) References Cited

U.S. PATENT DOCUMENTS

| | | |
|---|---|---|
| 7,917,894 B2* | 3/2011 | Chen et al. .................. 717/124 |
| 8,473,269 B1 | 6/2013 | Ou et al. |
| 8,572,606 B1 | 10/2013 | Agesen et al. |
| 8,683,444 B1 | 3/2014 | Spycher et al. |
| 9,262,299 B1* | 2/2016 | Wilmot ................. G06F 11/362 |
| 9,262,305 B1* | 2/2016 | Wilmot ................. G06F 17/50 |
| 2002/0059054 A1 | 5/2002 | Bade et al. |
| 2002/0162051 A1* | 10/2002 | Bolding ............. G06F 11/3632 714/34 |
| 2003/0149961 A1* | 8/2003 | Kawai et al. ................. 717/129 |
| 2007/0266376 A1 | 11/2007 | Yim et al. |
| 2008/0133897 A1 | 6/2008 | Reid et al. |
| 2008/0319730 A1 | 12/2008 | Clark et al. |
| 2009/0307299 A1 | 12/2009 | Malesich et al. |
| 2010/0153693 A1 | 6/2010 | Stall et al. |
| 2012/0151267 A1 | 6/2012 | Bhattacharjee et al. |
| 2012/0179447 A1 | 7/2012 | Lin et al. |
| 2013/0007720 A1 | 1/2013 | Cai et al. |
| 2013/0111266 A1 | 5/2013 | Tosaka |
| 2014/0196014 A1 | 7/2014 | Spycher et al. |
| 2015/0046920 A1* | 2/2015 | Allen ............................... 718/1 |
| 2015/0248343 A1* | 9/2015 | Ionescu et al. ............... 717/130 |

OTHER PUBLICATIONS

Rosenberg, J., How Debuggers Work, N.Y., John Wiley, 1996, pp. 107-133. QA76.9.D43 R67 1996.*

* cited by examiner

200

300

400

510

US 9,690,686 B1

METHOD FOR SETTING BREAKPOINTS IN AUTOMATICALLY LOADED SOFTWARE

BACKGROUND

Aspects of the present invention relate generally to the field of system development and test, and more specifically to event-driven simulation of electronics.

Simulation of hardware components can be modeled at various levels of abstraction using event-driven simulation. Processor models implementing Instruction Set Simulators (ISS) in combination with hardware simulators can be used to simulate cross-compiled embedded software, for example, an operating system (OS). A collection of hardware models running such embedded software is known as a Virtual Platform (VP). However, when developing VPs and the corresponding actual systems that they model, issues with incorrect or unexpected interactions between the hardware and software components of the system can occur. And because debuggers typically run on the same operating system on which the application is being tested, this can create atypical system conditions and reduce the effectiveness of the test and debug process.

Additionally, the OS and other applications running on the VP may also need to be debugged, requiring observation and control of the execution of software elements such as kernel modules, executable files and shared object libraries. However, many of these software elements are not explicitly loaded by the user, but instead are loaded automatically by the OS either as a part of the startup procedure or as the result of an interrupt.

Conventional systems are not well suited for debugging this automatically loaded software as they do not allow for the use of user defined breakpoints in the automatically loaded modules, files, or libraries. For example, in order to debug the initialization of automatically started software elements, the target environment or the software element itself must be adjusted. Otherwise, the startup of the file must have progressed to the point where a debug server process can be started, thereby making it impossible to debug the initialization of any processes started before the debug server.

Accordingly, there is a need in the art for a system that facilitates the debugging of files loaded during boot time or other automatically loaded files, such as kernel modules, executable files, and object libraries used during simulation.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Aspects of the present invention provide a system and method for a user of an event-driven simulator to specify breakpoint conditions in kernel modules, startup processes, and shared libraries before the target environment is initialized. The user specifies the breakpoints before starting a virtual platform debugger. The virtual platform then detects the specified breakpoints when the modified file is loaded onto the platform during startup of the environment and initialization of the processes. This allows breakpoints to be set on any software element (executable, shared library, or kernel module) before the target environment is started.

To detect a specified breakpoint, when a source code file is loaded, it is scanned or parsed to identify specified breakpoints. All loaded source code files, only those source code files that are automatically loaded, or only those source code files specified by the designer as modified may be scanned for specified breakpoints. A specified breakpoint may be identified by a predefined codeword or symbol that indicates the insertion of a breakpoint by the designer.

Figure 1:
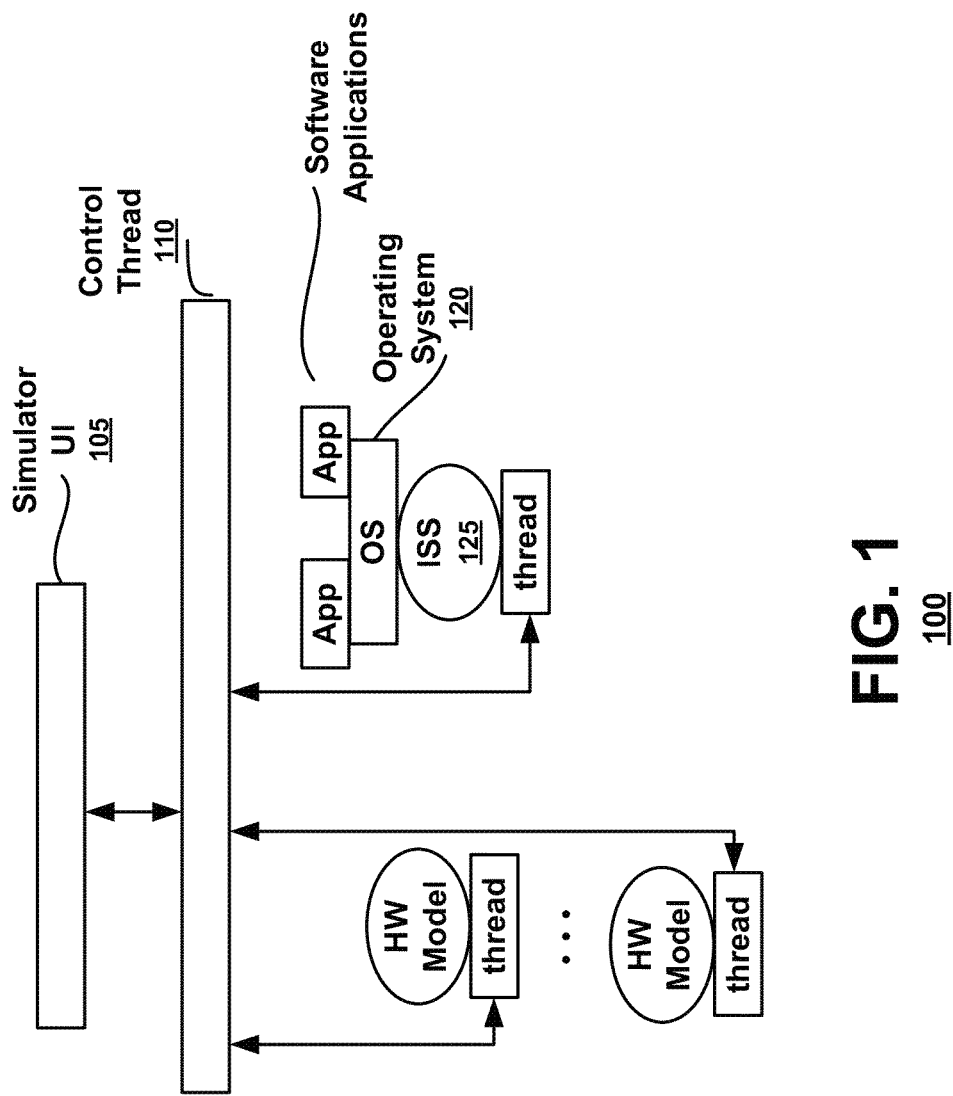
FIG. 1 illustrates an exemplary virtual platform according to an embodiment of the present invention.

FIG. 1 illustrates an exemplary virtual platform (VP) 100 according to an embodiment of the present invention. In FIG. 1, a simulator interface 105 is implemented to provide control and observability for the components of the VP 100. The simulator interface 105 is executed on a control thread 110.

A modeled component as described herein refers to either a hardware component, a bare-metal software program or OS running within the context of a processor hardware component, or a process running on an OS running within the context of a processor hardware component. Further information about the virtual platform is described in U.S. patent application Ser. Nos. 13/907,474, 13/907,516, and 13/907,566, each filed May 31, 2013, which are incorporated herein by reference in their entirety.

Simulator interface 105 runs in a control thread 110 separate from the modeled components of the virtual platform. State information and other simulation related information for the modeled components is then made available via simulation commands executed by the control thread 110 when control of the simulation returns to the control thread 110.

In FIG. 1, each modeled component is executed on a simulator thread. For example, each hardware model is executed on a simulator thread of the virtual platform. When a modeled component is executed in the course of the event driven simulation, the simulator thread for that model will become active. When a breakpoint or watchpoint in the source code implementing the modeled component is reached, the active simulator thread will yield control to the control thread 110. However, in conventional debugging, the breakpoints in source code are specified after the software module has been initialized and started. This makes it difficult to test software that is executed as part of the initialization and start up process as the debugger has no way to know the addresses to insert breakpoints until the relevant processes are loaded.

An OS 120 will be simulated in the VP 100 with reference to an ISS 125 modeling a processor instruction set running on a modeled hardware component. The OS 120 will initialize and startup as if running within the VP as if it were installed on a traditional computing device. The rules and breakpoints to be used to test the startup processes and libraries will be specified by the user in advance of the process initialization by inserting breakpoints directly into the source code of the module, program, function, line, etc. to be tested. Then the control thread 110 will detect the specified rule or breakpoint during execution of the module and will take steps accordingly to test or trace the relevant aspect of the module or to otherwise activate the breakpoint.

To insert a breakpoint that the control thread will recognize, the user can optionally provide to the VP 100 a list of names of the programs or modules containing a specified breakpoint, for example, by providing the name of the file that includes the breakpoint.

A user may specify breakpoints for various software elements, including executable files, shared libraries, and kernel modules, based on function names or source code lines. Then when the VP 100 starts, non-intrusive traps or hooks are placed on designated OS functions for loading the executable files, shared libraries, and kernel modules. A trap may also be established where task switching is done on the OS. A detectable hook may be established with the insertion of a symbol or keyword followed by the breakpoint command into the module or function.

When a software element that has been modified by the insertion of hooks or traps is loaded, the VP 100 looks for breakpoints, detects the modification, and creates the specified breakpoints in the VP 100 after offsetting the address according to where the software element is loaded on the VP 100. If a list of modified software elements is provided, the VP 100 may scan for specified breakpoints only in the listed elements. When a task switch is detected, any breakpoints that are not appropriate to the new context may be temporarily removed and any previously removed breakpoints which are appropriate to the new context may be restored.

Figure 2:
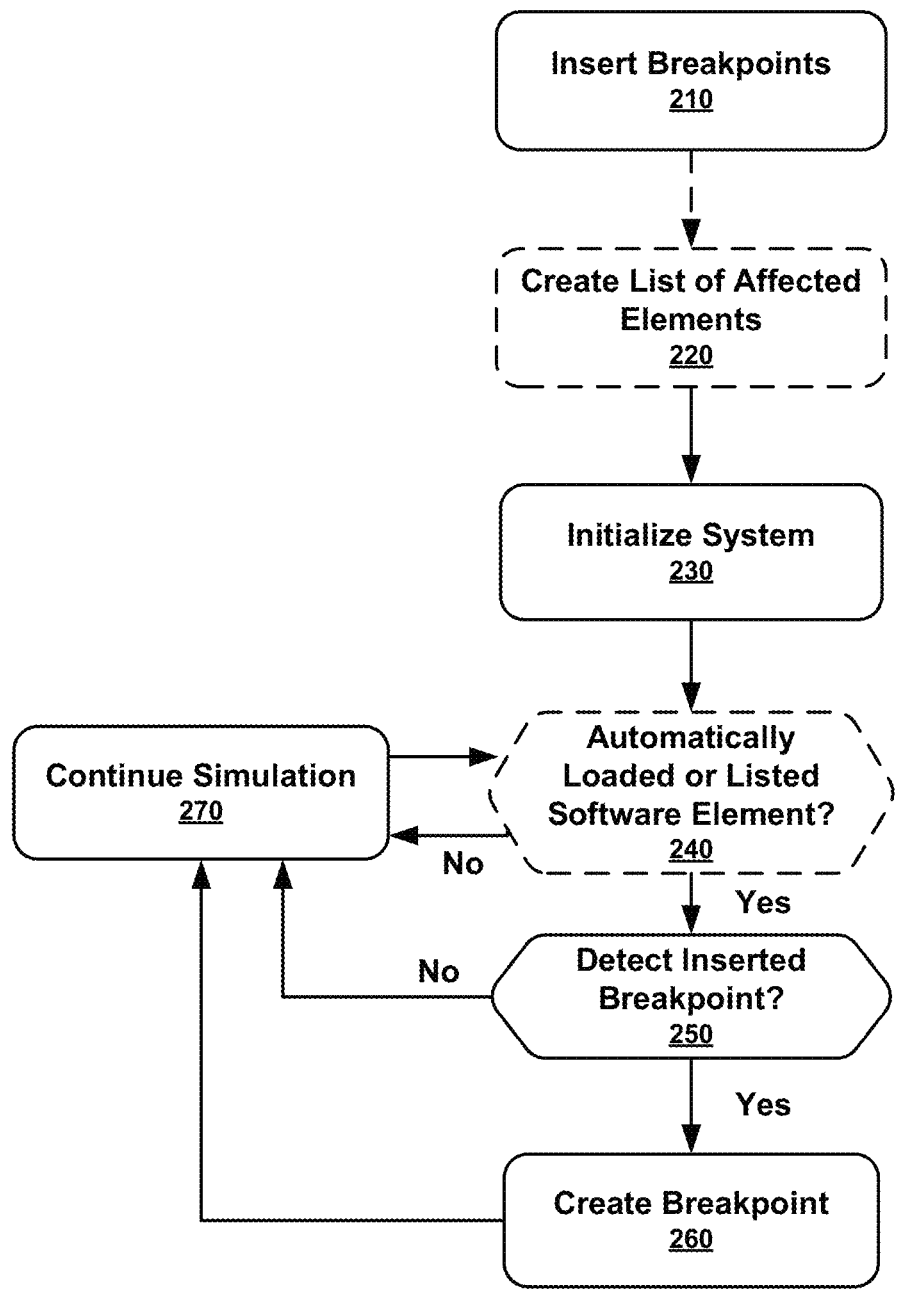
FIG. 2 illustrates an exemplary method for detecting breakpoints that facilitate testing of automatically loaded software elements in a virtual platform.

FIG. 2 illustrates an exemplary method 200 for detecting breakpoints that facilitate testing of automatically loaded software elements in a virtual platform. In FIG. 2, a designer initially inserts the breakpoints or traps into the desired files (block 210). Then the simulation may begin, including by loading kernel files and library files to initiate the simulation of an operating system (block 230). During the loading of files, the simulator will detect any specified breakpoints (block 250) and create the breakpoints in the virtual platform after offsetting the address of the breakpoint according to where the software element is loaded on the virtual platform debugger (block 260). Then the simulation executes the operating system and simulates the modeled components (block 270). During execution of the simulation, when an active process encounters a breakpoint, an active simulator thread will yield to the control thread to check for predefined actions or user input to utilize the breakpoint. Once the conditions of the breakpoint have been handled, the simulation may return to the simulator thread that was executing when the breakpoint was reached or otherwise continue the simulation.

Optionally, as indicated with dotted lines in FIG. 2, the designer may create a list of modified files or modules that have been modified with breakpoints and provide the list to the simulator prior to initialization of the virtual platform or operating system (block 220). Then, when a listed software element is loaded into the system (block 240), the simulator will scan or parse the identified element for the specified breakpoint(s). Alternatively, the simulator may scan only those elements that are automatically loaded (block 240), such as kernel files, executable files, or shared libraries.

Figure 3:
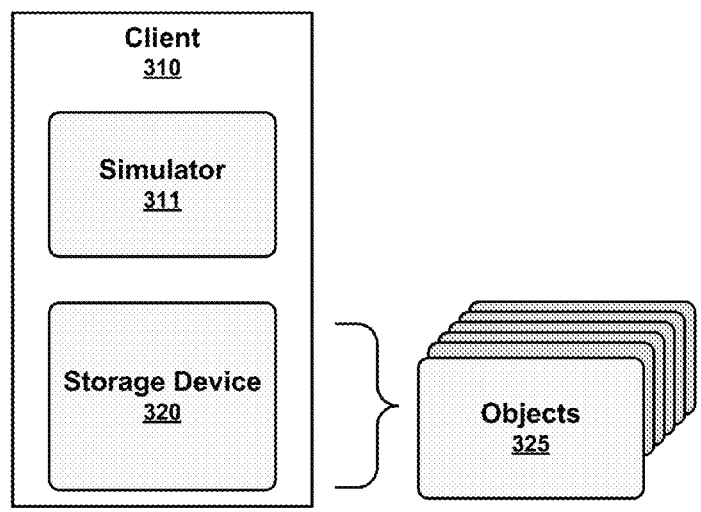
FIG. 3 is a simple block diagram illustrating components of an exemplary system according to an embodiment of the present invention.

A user may access a virtual platform simulator interface in a standalone client system, client-server environment, or a networked environment. FIG. 3 is a simple block diagram illustrating components of an exemplary system 300 according to an embodiment. As shown in FIG. 3, a system 300 may comprise a client 310 executing a simulator 311 and having a memory storage 320. The client 310 may be any computing system that executes a simulator 311 or otherwise facilitates access to memory storage 320, for example a personal computer. The client 310 may include a processor that performs a method in accordance with the disclosed embodiments. Such a client would be part of an overall simulation system in accordance with the disclosed embodiments.

Hardware models, instruction sets, software packages, instances of the modeled components, state information for the modeled components, and other objects 325 used by the simulator 311 may be stored in memory storage 320. A user may access the objects 325 stored in memory storage 320 with the client 310 via the simulator 311, where the simulator 311 is capable of accessing memory storage 320 and displaying the objects 325 and the data associated with the simulation. The simulator 311 may include a user interface, for example a program, application or middleware that acts as a frontend to and facilitates access to objects in memory storage 320. The simulator 311 may facilitate control over and observability into the simulation of the components implemented in a virtual platform using the display and edit tools and procedures described herein. The user may interact with the simulator 311 through a number of input devices, such as by inputting a selection as with a mouse or inputting a request as with a keyboard. The user may observe the simulation results on an output device or display. The simulator 311 may run in an application window controlled by the user.

As shown in FIG. 3, a client 310 may be a stand-alone system, as may be of particular interest where the components being simulated are highly confidential. Additionally, according to an aspect of an embodiment as shown in FIG. 4, a client 410 may be part of a networked environment.

Figure 4:
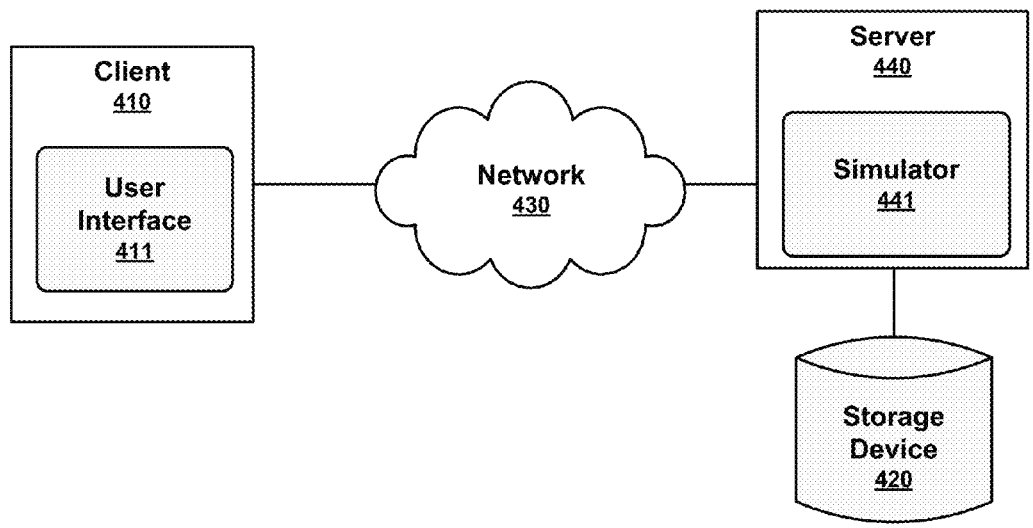
FIG. 4 is a simple block diagram illustrating components of an exemplary system according to an embodiment of the present invention.

FIG. 4 is a simple block diagram illustrating components of an exemplary system 400 according to an embodiment. As shown in FIG. 4, system 400 may include a client 410 having a user interface 411. The client 410 may be connected to a server 440 via a network 430. The simulator 441, which in this embodiment is located at server 440, may have access to storage device 420 storing hardware models, instruction sets, software packages, instances of the modeled components, state information for the modeled components, and other objects utilized by the simulator 441. The server 440 may include a processor that performs a method in accordance with the disclosed embodiments. Such a server then would be part of an overall simulation system in accordance with the disclosed embodiments.

A user may access a simulator 441 at the server 440 via the client 410 having a user interface 411 capable of accessing and displaying the components implemented as part of a virtual platform and the results of the simulation of those components. The client 410 may be any computing system that facilitates the user accessing storage device 420, for example a personal computer. The network 430 may be a wired or wireless network that may include a local area network (LAN), a wireless area network, the Internet, or any other network available for accessing storage device 420 from the client 410.

The server 440 may be a network server accessible to the client 410 via the network 430 that may manage access to storage device 420. The user interface 411 may receive instructions regarding a simulation from the user and utilizing the objects stored in memory storage 420, facilitate a display of the simulation or the information gathered during the simulation. Multiple different clients (not shown) may access storage device 420 via the network 440 and request access to the objects stored therein.

In another networked environment, the simulator may be executed on a network capable client and access the models, packages and other objects stored in one or more storage devices via a network and communications server.

Figure 5:
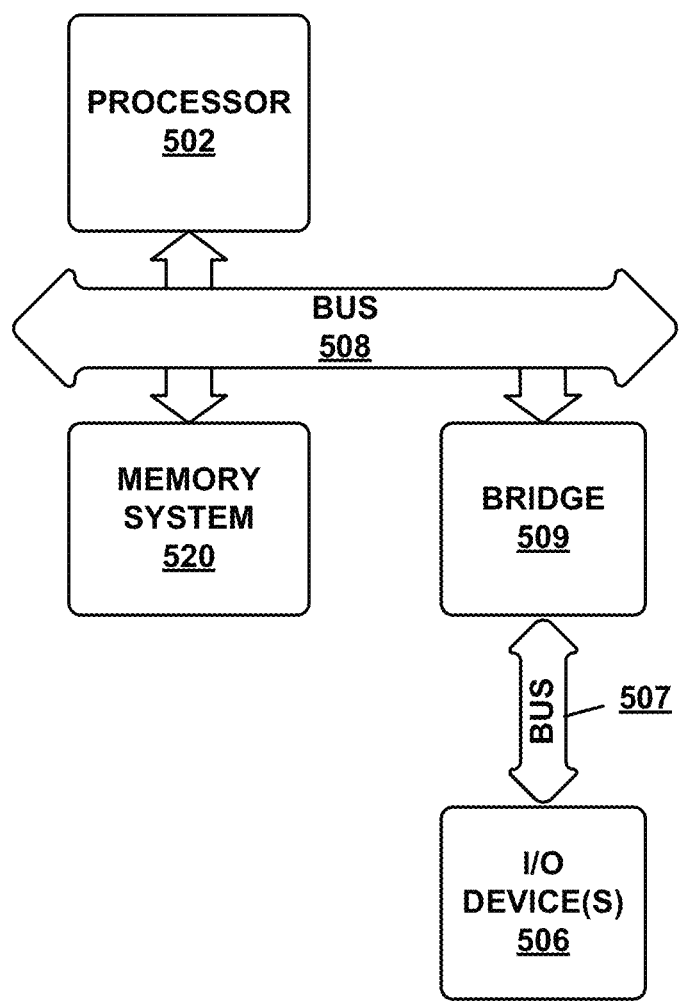
FIG. 5 is a simple block diagram illustrating components of an exemplary client according to an embodiment of the present invention.

FIG. 5 is a simple block diagram illustrating components of an exemplary client 510 according to an embodiment of the present invention. As shown in FIG. 5, the client 510 configured to execute the simulator as described herein may include a processor 502, a memory system 520 and one or more input/output (I/O) devices 506 in communication. The communication can be implemented in a variety of ways and may include one or more computer buses 507, 508 and/or bridge devices 509 as shown in FIG. 5. The I/O devices 506 can include network adapters and/or mass storage devices from which the client 510 can receive commands for executing the simulation.

As shown in FIG. 3, a client 510 may be a stand-alone system, as may be of particular interest where the components being simulated are highly confidential. Additionally, according to an aspect of an embodiment as shown in FIG. 4, a client 510 may be part of a networked environment.

Although described primarily with reference to breakpoints, the simulator can also traverse the source code for proper watchpoints, for example by detecting when a particular variable is written, read, or changed.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for simulating modeled components in a virtual platform, the method comprising:
on a computer device having an interface for the virtual platform:
initiating a simulation of an operating system operating in the virtual platform by loading source code files that correspond to the modeled components into a debugger in the virtual platform, wherein the source code files include files of software elements that are automatically loaded by the operating system during a startup procedure, and wherein at least some of the source code files contain breakpoint indicators;
scanning the loaded source code files for the breakpoint indicators in response to the loading of the source code files into the debugger;
upon detecting a breakpoint indicator in a particular loaded source code file, calculating a location of a corresponding breakpoint in a memory of the virtual platform debugger based on a location where the particular loaded source code file was loaded into the debugger; and
creating the corresponding breakpoint at the calculated location.

2. The method of claim 1, wherein the breakpoint indicators are inserted into the source code files prior to initialization of the virtual platform.

3. The method of claim 1, wherein the breakpoint indicators are inserted into the source code files prior to initialization of the operating system.

4. The method of claim 1, wherein the breakpoint indicators are inserted into a source code file of at least one of the software elements that are automatically loaded by the operating system.

5. The method of claim 1, wherein the breakpoint indicators include a keyword inserted into the particular loaded source code file at a start of a specified breakpoint.

6. The method of claim 1, wherein the breakpoint indicators include a symbol inserted into the particular loaded source code file at a start of a specified breakpoint.

7. The method of claim 1, further comprising receiving a list of software elements that contain breakpoint indicators.

8. The method of claim 7, wherein said scanning occurs only for files of the software elements identified on the list.

9. The method of claim 1, wherein said scanning occurs only for source code files of the software elements that are automatically loaded by the operating system.

10. The method of claim 1, wherein the loaded source code files include at least one of a shared library or a kernel module.

11. The method of claim 1, wherein the loaded source code files are used during initialization of the operating system.

12. A system comprising:
a memory to store a plurality of component models of a virtual platform and source code for software elements modeled on the plurality of component models; and
a processor configured to:
initiate a simulation of an operating system operating in the virtual platform by loading source code files that correspond to the plurality of component models into a debugger in the virtual platform, wherein the source code files include files of software elements that are automatically loaded by the operating system during a startup procedure, and wherein at least some of the source code files contain breakpoint indicators;
parse the loaded source code files for the breakpoint indicators in response to the loading of the source code files into the debugger;
upon detecting a breakpoint indicator in a particular loaded source code file, calculate a location of a corresponding breakpoint in a memory of the virtual platform debugger based on a location where the particular loaded source code file was loaded into the debugger; and create the corresponding breakpoint at the calculated location.

13. The system of claim 12, wherein the breakpoint indicators are inserted into the source code files prior to initialization of the virtual platform.

14. The system of claim 12, wherein the breakpoint indicators are inserted into the source code files prior to initialization of the operating system.

15. The system of claim 12, wherein the breakpoint indicators are inserted into a source code file of at least one of the software elements that are automatically loaded by the operating system.

16. The system of claim 12, wherein the breakpoint indicators include a keyword inserted into the particular loaded source code file at a start of a specified breakpoint.

17. The system of claim 12, wherein the breakpoint indicators include a symbol inserted into the particular loaded source code file at a start of a specified breakpoint.

18. The system of claim 12, wherein said processor is further configured to receive a list of software elements that contain breakpoint indicators.

19. The system of claim 18, wherein said parsing occurs only for files of the software elements identified on the list.

20. The system of claim 12, wherein said parsing occurs only for source code files of the software elements that are automatically loaded by the operating system.

* * * * *